(12) United States Patent
Gullentops (10) Patent No.: US 9,393,771 B2
(45) Date of Patent: Jul. 19, 2016

(54) SYSTEM AND METHOD FOR THE DIGITAL CREATION OF A PRINT MASTER BY MEANS OF A LIQUID DROPLET DEPOSITION APPARATUS

(75) Inventor: Chris Gullentops, Kessel-Lo (BE)

(73) Assignee: AGFA GRAPHICS NV, Mortsel (BE)

( * ) Notice: Subject to any disclaimer, the term of this patent is extended or adjusted under 35 U.S.C. 154(b) by 274 days.

(21) Appl. No.: 13/883,622

(22) PCT Filed: Dec. 7, 2011

(86) PCT No.: PCT/EP2011/072079
§ 371 (c)(1),
(2), (4) Date: May 6, 2013

(87) PCT Pub. No.: WO2012/080058
PCT Pub. Date: Jun. 21, 2012

(65) Prior Publication Data
US 2013/0222452 A1    Aug. 29, 2013

Related U.S. Application Data

(60) Provisional application No. 61/425,283, filed on Dec. 21, 2010.

(30) Foreign Application Priority Data

Dec. 16, 2010 (EP) ..................... 10195328

(51) Int. Cl.
*B41C 3/08* (2006.01)
*B41C 1/00* (2006.01)
(Continued)

(52) U.S. Cl.
CPC ............... *B41C 1/003* (2013.01); *B41J 3/4073* (2013.01); *B41J 11/002* (2013.01)

(58) Field of Classification Search
CPC ....... B41J 19/16; B41J 2/0456; B41J 2/04541
See application file for complete search history.

(56) References Cited

U.S. PATENT DOCUMENTS 4,992,890 A    2/1991    Pinard et al.
6,193,923 B1   2/2001    Leyden et al.
(Continued)

FOREIGN PATENT DOCUMENTS

EP    1 428 666 A1    6/2004
EP    2 199 065 A1    6/2010
EP    2 199 066 A1    6/2010

OTHER PUBLICATIONS

Official Communication issued in International Patent Application No. PCT/EP2011/072079, mailed on Jan. 12, 2012.
(Continued)

*Primary Examiner* — Matthew G Marini
(74) *Attorney, Agent, or Firm* — Keating and Bennett, LLP (57) ABSTRACT

A relief print master is created by a printhead that moves in a slow scan direction. The nozzles of the printhead jet droplets of a polymerisable liquid on a rotating drum. The different nozzles jet droplets simultaneously on different layers that have different diameters. As a result, the droplets jetted by different nozzles travel over different distances before landing. The effect of this is that the droplets undergo different position lag as they land on the different layers. By rotating the printhead in a plane that includes the central axis of the rotating drum and a nozzle row this effect can be compensated for.

6 Claims, 5 Drawing Sheets

(51) Int. Cl.
*B41J 3/407* (2006.01)
*B41J 11/00* (2006.01)

(56) References Cited

U.S. PATENT DOCUMENTS

| | | |
|---|---|---|
| 2003/0189617 A1 | 10/2003 | Mott et al. |
| 2004/0131778 A1* | 7/2004 | Verhoest et al. ............. 427/258 |
| 2004/0252174 A1 | 12/2004 | Baxter et al. |
| 2005/0046651 A1 | 3/2005 | Askren et al. |
| 2008/0102389 A1* | 5/2008 | Inagaki et al. ............. 430/58.05 |
| 2009/0197013 A1 | 8/2009 | Gouch et al. |
| 2010/0072181 A1 | 3/2010 | Maschera et al. |

OTHER PUBLICATIONS

Gullentops, "System and Method for Digital Creation of a Print Master Using a Multiple Printhead Unit", U.S. Appl. No. 13/581,691, filed Aug. 29, 2012.

Gullentops, "System and Method for Digital Creation of a Print Master Using a Multiple Printhead Unit", U.S. Appl. No. 13/816,384, filed Feb. 11, 2013.

Gullentops, "Digital System for Creating a Flexographic Printmaster", U.S. Appl. No. 13/816,379, filed Feb. 11, 2013.

* cited by examiner

SYSTEM AND METHOD FOR THE DIGITAL CREATION OF A PRINT MASTER BY MEANS OF A LIQUID DROPLET DEPOSITION APPARATUS

CROSS-REFERENCE TO RELATED APPLICATIONS

This application is a 371 National Stage Application of PCT/EP2011/072079, filed Dec. 7, 2011. This application claims the benefit of U.S. Provisional Application No. 61/425,283, filed Dec. 21, 2010, which is incorporated by reference herein in its entirety. In addition, this application claims the benefit of European Application No. 10195328.9, filed Dec. 16, 2010, which is also incorporated by reference herein in its entirety.

BACKGROUND OF THE INVENTION

1. Field of the Invention

The invention deals with the field of three dimensional printing, more specifically the printing of relief features on a rotating cylindrical support using a fluid depositing apparatus such as an inkjet printhead. Even more specifically, the invention deals with the field of creating a flexographic print master on a rotating drum by a printhead that moves in a slow scan direction and deposits curable liquid such as a UV-curable liquid.

2. Description of the Related Art

In flexographic printing or flexography a flexible cylindrical relief print master is used for transferring a fast drying ink from an anilox roller to a printable substrate. The print master can be a flexible plate that is mounted on a cylinder, or it can be a cylindrical sleeve.

The raised portions of the relief print master define the image features that are to be printed.

Because the flexographic print master has elastic properties, the process is particularly suitable for printing on a wide range of printable substrates including, for example, corrugated fiberboard, plastic films, or even metal sheets.

A traditional method for creating a print master uses a light sensitive polymerisable sheet that is exposed by a UV radiation source through a negative film or a negative mask layer ("LAMS"-system) that defines the image features. Under the influence of the UV radiation, the sheet will polymerize underneath the transparent portions of the film. The remaining portions are removed, and what remains is a positive relief print plate.

In the applications EP-A 2199065 and EP-A 2199066, both assigned to Agfa Graphics NV and having a priority date of 2008-12-19, a digital solution is presented for creating a relief print master using a fluid droplet depositing printhead.

The application EP-A 2199065 teaches that a relief print master can be digitally represented by a stack of two-dimensional layers and discloses a method for calculating these two-dimensional layers.

The application EP-A 2199066 teaches a method for spatially diffusing nozzle related artifacts in the three dimensions of the stack of two-dimensional layers.

Both applications also teach a composition of a fluid that can be used for printing a relief print master, and a method and apparatus for printing such a relief print master.

Figure 1:
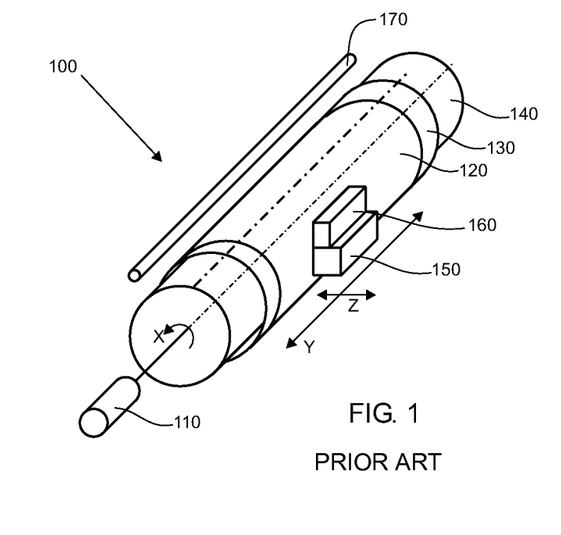
FIG. 1 shows an embodiment of a prior art apparatus for printing a relief print master on a sleeve.

FIG. 1 shows a preferred embodiment of such an apparatus 100. 140 is a rotating drum that is driven by a motor 110. A printhead 150 moves in a slow scan direction Y parallel with the axis of the drum at a linear velocity that is locked with the rotational speed X of the drum. The printhead jets droplets of a polymerisable fluid onto a removable sleeve 130 that is mounted on the drum 140. These droplets are gradually cured by a curing source 160 that moves along with the printhead and provides local curing. When the relief print master 120 has been printed, the curing source 170 provides an optional and final curing step that determines the final physical characteristics of the relief print master 120.

Figure 3:
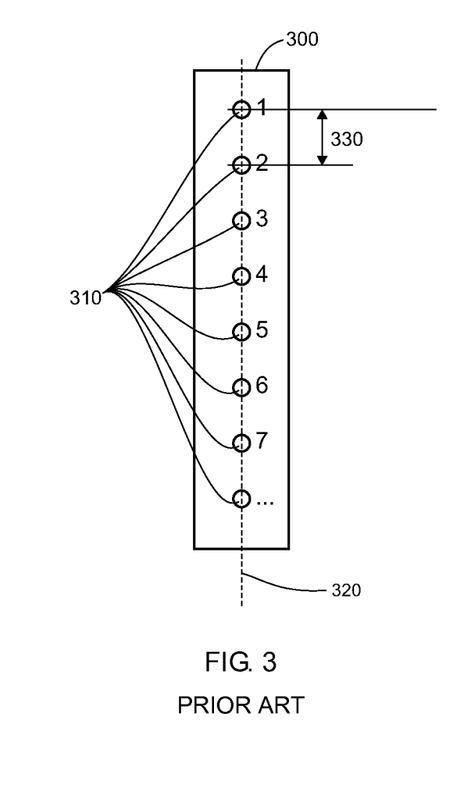
FIG. 3 shows a prior art printhead with a single row of nozzles.

An example of a printhead is shown in FIG. 3. The printhead 300 has nozzles 310 that are arranged on a single axis 320 and that have a periodic nozzle pitch 330. The orifices of the nozzles are located in a plane that corresponds with the nozzle plate.

Figure 2:
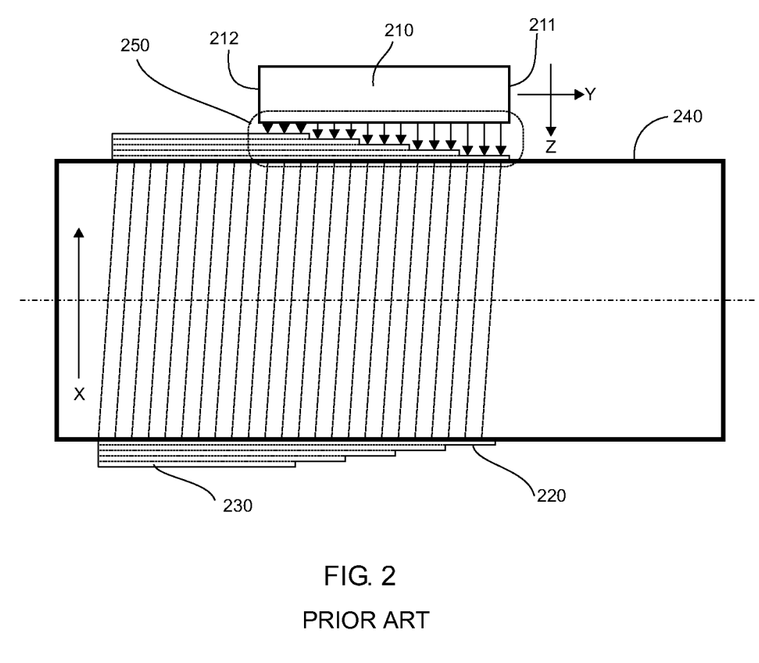
FIG. 2 shows a different view of an embodiment of a prior art apparatus for printing a relief print master on a sleeve.

FIG. 2 demonstrates that, as the printhead 210 moves from left to right in the direction Y, droplets 250 are jetted onto the sleeve 240 whereby the "leading" portion 211 of the printhead 210 prints droplets that belong to a layer 220 having a relatively smaller diameter, whereas the "trailing" portion 212 of the printhead 210 prints droplets on a layer 230 having a relatively larger diameter.

Because in the apparatus in FIG. 1 and FIG. 2 the linear velocity of the printhead in the direction Y is locked with the rotational speed X of the cylindrical sleeve 130, 240, each nozzle of the printhead jets fluid along a spiral path on the rotating drum. This is illustrated in FIG. 4, where it is shown that fluid droplets ejected by nozzle 1 describe a spiral path 420 that has a pitch 410.

Figure 4:
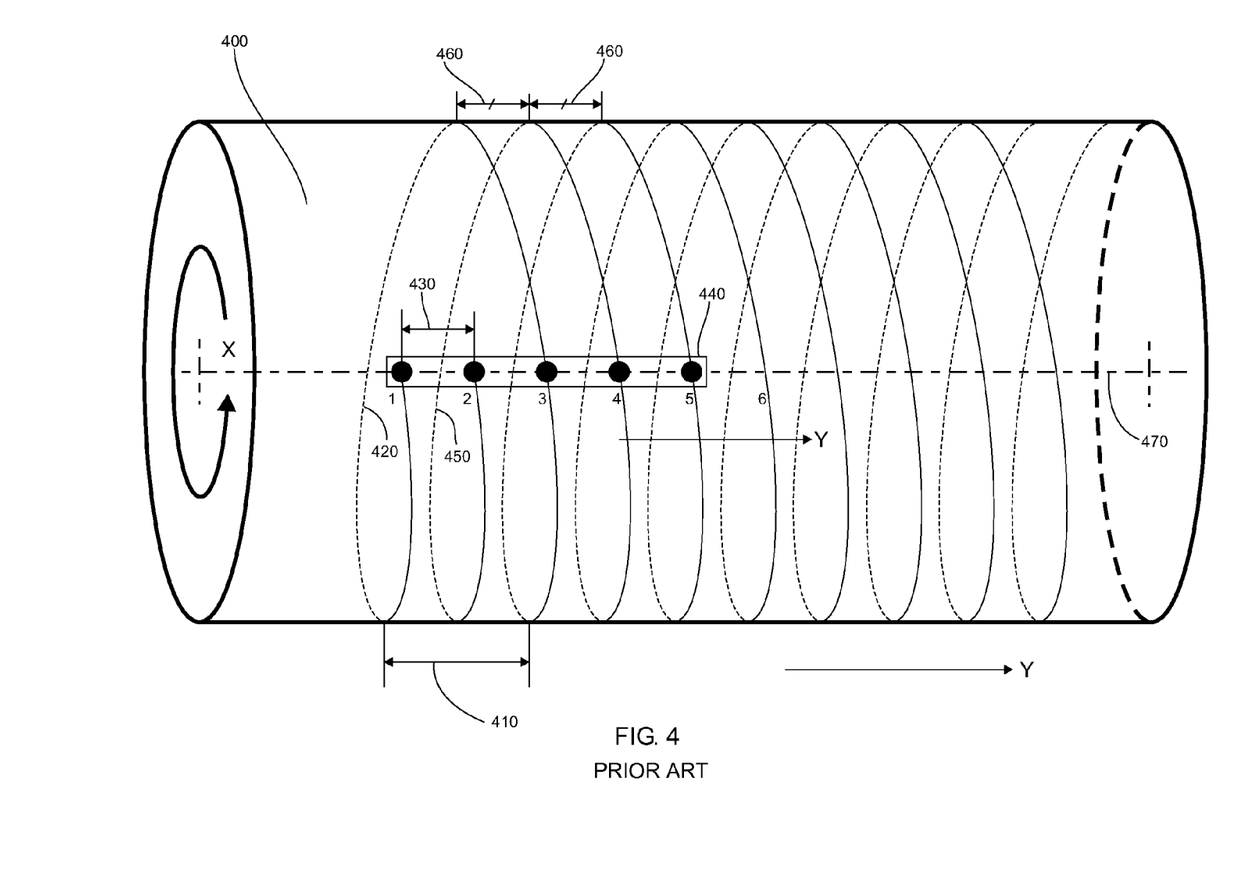
FIG. 4 shows two spiral paths on which the fluid droplets ejected by the nozzles of a printhead as in FIG. 3 land.

In FIG. 4, the pitch 410 of the spiral path 420 was selected to be exactly double the length of the nozzle pitch 430 of the printhead 440. The effect of this is that all the droplets of nozzles 1, 3, 5 having an odd index number fall on the first spiral path 420, whereas the droplets ejected by nozzles 2, 4, 6 having an even index number fall on the second spiral path 450. Both spiral paths 420 and 450 are interlaced and spaced at an even distance 460 that corresponds with the nozzle pitch 430.

A prior art system such as the one depicted in FIG. 2 and FIG. 4 suffers from an unexpected problem.

The droplets that are ejected by the nozzles of the printhead 210, 440 have a finite velocity while they travel to their landing position. As a result it takes some time for them to reach their landing position on the rotating drum. The effect can be described as "landing position lag". This landing position lag—by itself—poses no problem. However, in the prior art system shown in FIG. 2, the nozzles near the leading edge 211 of the printhead eject droplets that land on a layer of the print master having a relatively smaller diameter, whereas the nozzles near the trailing edge 212 of the printhead eject droplets that land on a layer having a relatively larger diameter.

The effect of this is that the droplets ejected by nozzles near the leading edge of the printhead are subject to more landing position lag compared with droplets ejected by nozzles near the trailing edge of the printhead. This results in a distortion of the three-dimensional grid that makes up the relief print master, since droplets that are intended to be stacked on top of each other in the different layers will be shifted relatively to each other in the X dimension. This distortion weakens the matrix of droplets that make up the relief print master.

SUMMARY OF THE INVENTION

In order to overcome the problems described above, preferred embodiments of the invention reduce the geometrical distortion of the matrix of cured droplets that make up the relief print master and that results from the effects of landing position lag in a prior art system as the one shown in FIG. 2.

Preferred embodiments of the invention can be realized by rotating the printhead in a plane that comprises the central axis of the rotating cylindrical support in a direction and by an amount that reduces or eliminates the effects of landing position lag.

Preferred embodiments are described below. Various other preferred embodiments are also described below.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

FIG. 4 shows a prior art system that is suitable for creating a relief print master and that can serve as the basis for an improved system according to a preferred embodiment of the current invention.

Figure 5:
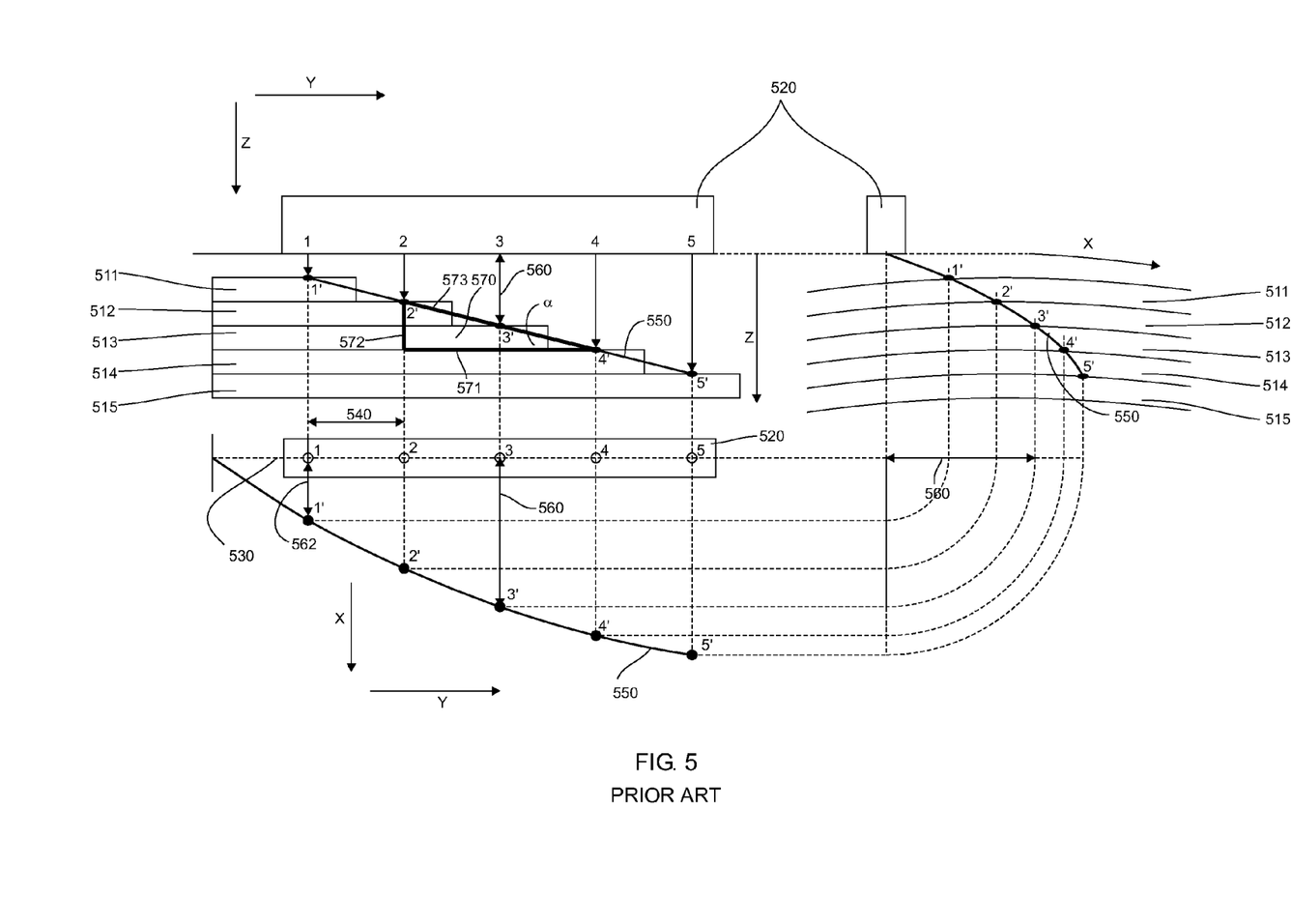
FIG. 5 shows projections in the Y-Z, X-Y and X-Z planes that demonstrate the effect of landing position lag in a prior art system.

FIG. 5 shows projections on three different orthogonal planes of the relevant portions of the prior art system in FIG. 4.

The cylindrical support 400 in FIG. 4 rotates at a frequency of NumberofRevolutionsperSecond along a central axis 470.

In FIG. 4 and FIG. 5, a printhead unit 440, 520 has nozzles that are arranged on a nozzle row 530. The distance between the nozzle row 530 and the central axis of the rotating cylinder is referred to by the variable NozzlePlateDistance. In the prior art system shown in FIG. 4 and FIG. 5 the nozzle row 530 is parallel with the central axis 470 of the rotating cylindrical support 400.

Every nozzle of the printhead 440, 520 has an index number j that in FIG. 4 and FIG. 5 ranges from 1 to 5. The distance between two adjacent nozzles is the nozzle pitch, represented by the variable NozzlePitch and is indicated with the reference signs 430 (in FIG. 4) and 540 (in FIG. 5). In the remaining part of this document a nozzle having an index number j will be referred to as "nozzle[j]".

The Y dimension in FIG. 4 and FIG. 5 is parallel with the central axis 470 of the drum 400 (in FIG. 4). The Y direction corresponds with the movement of the printhead in the Y dimension and is indicated by the arrow in the drawings. The speed of the movement of the printhead 440, 520 in the Y-dimension is locked with the frequency of the rotating cylindrical drum support.

The X dimension in FIG. 4 and FIG. 5 indicates the direction in which a point on the surface of the rotating drum moves relative to the printhead 440, 520. Because in the context of the current invention the diameter of the cylindrical support is significantly larger than the displacement of a point on the surface during the relevant time frame of the rotation of the cylindrical support, the X-dimension can be locally approximated by a straight line that is tangential to the surface of the drum and that is orthogonal with regard to the central axis of the cylindrical drum. A rendering of the X-dimension is indicated in the X-Z projection (on the right-hand side) of FIG. 5, where the layers 511, 512, 513, 514 and 515 have a nearly flat curvature. In the calculations that follow, the X-dimension is locally approximated by a straight line.

The Z direction is orthogonal to both the X and Y dimensions and indicates the height with regard to a reference surface in an X-Y plane. In FIG. 5 the nozzle plane, i.e. a fictitious plane in which the orifices of the nozzles are located serves as a reference plane.

In a more general preferred embodiment, a printhead unit according to the current invention can have any number of nozzles on a nozzle row higher than one. Also, in a more general preferred embodiment a printhead unit can optionally have multiple parallel nozzle rows that can be staggered, for example for increasing the resolution of the printhead unit compared with the resolution of a printhead having a single row of nozzles. In that case, the multiple parallel rows are located in a plane that is parallel with a tangent plane of the rotating cylindrical support.

The nozzles 1, 2, 3, 4 and 5 of the printhead unit 520 in FIG. 5 eject droplets that land on the different layers 511, 512, 513, 514 and 515. The landing positions are indicated with the reference numbers 1', 2', 3', 4' and 5'.

These positions 1', 2', 3', 4' and 5' of the landed droplets can be connected by a curve 550.

The printhead 440, 520 has a leading edge portion that contains a nozzle that jets onto a layer having a relatively smaller diameter and a trailing edge portion that comprises a nozzle that jets onto a layer having a relatively (with regard to the layer on which the nozzle belonging to the leading edge jets) larger diameter. For example, in FIG. 5 a nozzle[4] which jets onto layer 514 would belong to a leading edge portion of the printhead, whereas nozzle[2] jetting onto layer 512 would belong to a trailing edge portion of the printhead.

PART 1 of the Mathematical Analysis

In FIG. 5 any given layer 511, 512, 513, 514 and 515 on the drum has a diameter represented by the variable Diameter[i] in which i is an index number that refers to the layer. In the remaining part of the text, a layer having an index number i will be referred to as "layer[i]".

The circumference of such a layer i is represented by the variable Circumference[i] and has a value equal to:

$$\text{Circumference}[i] = PI * \text{Diameter}[i]$$

The sleeve rotates in an X-direction at a frequency that is represented by the variable NumberofRevolutionsperSecond. The circumferential speed of a given layer i of the sleeve is represented by the variable CircumferentialSpeed[i] and expresses the displacement $\Delta x[i]$ of a surface point on the layer in the X dimension per time unit.

$$\text{CircumferentialSpeed}[i] = \Delta x[i]/\Delta t$$

The value of CircumferentialSpeed[i] is equal to:

$$\begin{aligned} \text{CircumferentialSpeed}[i] &= \text{Circumference}[i] * \\ &\quad \text{NumberofRevolutionsperSecond} \\ &= PI * \text{Diameter}[i] * \\ &\quad \text{NumberofRevolutionsperSecond} \end{aligned}$$

PART 2 of the Mathematical Analysis

A nozzle[j] ejects a droplet at a time point t1 with a speed equal to DropletVelocity in the Z-dimension. The value of the speed DropletVelocity is a characteristic of the printhead unit and is expressed by:

$$DropletVelocity = \Delta z / \Delta t$$

$\Delta z[i][j]$ is the distance between a nozzle[j] and the surface of a layer[i] on which the droplets ejected by nozzle[j] land. For example, in FIG. 5 $\Delta z[3][3]$ (indicated by the reference sign 560) is the distance between nozzle[3] and the layer[3] (indicated by reference sign 513) on which the droplets ejected by nozzle[3] land.

If it is assumed that the droplet velocity is constant over the trajectory $\Delta z[i][j]$, the time $\Delta t[i][j]$ it takes for the droplet to travel over the distance $\Delta z[i][j]$ is expressed by:

$$\Delta t[i][j] = \Delta z[i][j]/DropletVelocity$$

The droplet ejected by a nozzle[j] arrives at the surface of the layer[i] at a time t2 which is equal to:

$$t2 = t1 + \Delta t[i][j] = t1 + \Delta z[i][j]/DropletVelocity$$

PART 3 of the Mathematical Analysis

Referring to FIG. 5, the x-coordinate (along the X-dimension) of the position of nozzle[j] can be referred to as $x[0][j]$. It is effectively determined by the x coordinate where a radial plane that comprises the nozzle intersects with the X-axis.

Similarly, the x-coordinate of a droplet that was ejected by nozzle[j] and that has landed on layer[i] can be referred to as $x[i][j]$. It is effectively determined by the x coordinate where a radial plane that comprises the position of the landed droplet intersects with the X-axis.

The difference between the x-coordinate $x[0][j]$ of the nozzle[j] and the x-coordinate $x[i][j]$ is referred to as $\Delta x[i][j]$ and is defined as:

$$\Delta x[i][j] = x[i][j] - x[0][j]$$

While a droplet ejected by a nozzle[j] travels from the orifice of the nozzle to the surface of a layer[i] of the drum, this surface has moved during a period $\Delta t[i][j]$ over a distance $\Delta x[i][j]$ in the x dimension that is equal to:

$$\Delta x[i][j] = CircumferentialSpeed[i] * \Delta t[i][j]$$

Substituting in the above expression the variables CircumferentialSpeed[i] (from PART 1) and $\Delta t[i][j]$ (from PART 2) leads to:

$$\Delta x[i][j] = CircumferentialSpeed[i] * (\Delta z[i][j]/DropletVelocity)$$

$$\Delta x[i][j] = PI * Diameter[i] * NumberofRevolutionsperSecond * (\Delta z[i][j]/DropletVelocity)$$

If the nozzle plate of a printhead is located at a distance having a value NozzlePlateDistance from the axis of the drum, and a layer[i] on the drum has a diameter equal to Diameter[i], then the distance $\Delta z[i][j]$ between a nozzle[j] and a layer[i] can be expressed as:

$$\Delta z[i][j] = NozzlePlateDistance - (Diameter[i]/2)$$

By substituting this expression for $\Delta z[i][j]$ into the expression for $\Delta x[i][j]$, the following new expression is obtained for $\Delta x[i][j]$:

$$\Delta x[i][j] = PI * Diameter[i] * NumberofRevolutionsperSecond * (NozzlePlateDistance - (Diameter[i]/2))/DropletVelocity$$

The above expression provides the value for the x-coordinate of the landing position:

$$x[i][j] = x[0][j] + \Delta x[i][j]$$

$$x[i][j] = x[0][j] + PI * Diameter[i] * NumberofRevolutionsperSecond * (NozzlePlateDistance - (Diameter[i]/2))/DropletVelocity$$

Defining a constant K having a value equal to:

$$K = PI * NumberofRevolutionsperSecond/DropletVelocity$$

optionally simplifies the expression for $\Delta x[i][j]$ to:

$$\Delta x[i][j] = K * Diameter[i] * (NozzlePlateDistance - (Diameter[i]/2))$$

PART 4: Interpretation of the Mathematical Analysis

For a given nozzle[j], the expression for $\Delta x[i][j]$ is a quadratic function of the Diameter[i] of the layer[i] on which its ejected droplets land.

K is a constant of which the sign depends on the sign of variable NumberofRevolutionsperSecond. In what follows it is assumed that both the variables NumberofRevolutionsperSecond and hence K have a positive sign.

The structural relation between the drum and the printhead dictates that for an arbitrary layer the following constraint must be met:

$$Diameter[i]/2 <= NozzlePlateDistance$$

The value of $\Delta x[i][j]$ becomes 0 in the special case that:

$$Diameter[i]/2 = NozzlePlateDistance$$

As the value Diameter[i] of the diameter of a layer linearly decreases, the value of $\Delta x[i][j]$ quadratically increases.

PART 5: Correction

Referring to FIG. 5, the landing position of a droplet ejected by the nozzle[1] on the layer[1] is shifted over a distance $\Delta x[1][1]$ (reference sign 562) in the opposite X direction, whereas the landing position of a droplet ejected by the nozzle[5] on the layer[5] is shifted over a distance $\Delta x[5][5]$ (reference sign 563) in the opposite X direction. Using the previous equations, the distances $\Delta x[1][1]$ and $\Delta x[5][5]$ can be expressed:

$$\Delta x[1][1] = K * Diameter[1] (NozzlePlateDistance - Diameter[1]/2)$$

$$\Delta x[5][5] = K * Diameter[5] (NozzlePlateDistance - Diameter[5]/2)$$

The difference $(\Delta x[5][5] - \Delta x[1][1])$ in the x dimension between the landing positions of droplets ejected by nozzle[1] and nozzle[5] is expressed by:

$$(\Delta x[5][5] - \Delta x[1][1]) = K * NozzlePlateDistance * (Diameter[5] - Diameter[1]) - K * (Diameter[5]^2 - Diameter[1]^2)/2$$

All the values in the above expression are design parameters of the system so that the value of $(\Delta x[5][5] - \Delta x[1][1])$ can be easily evaluated.

Figure 6:
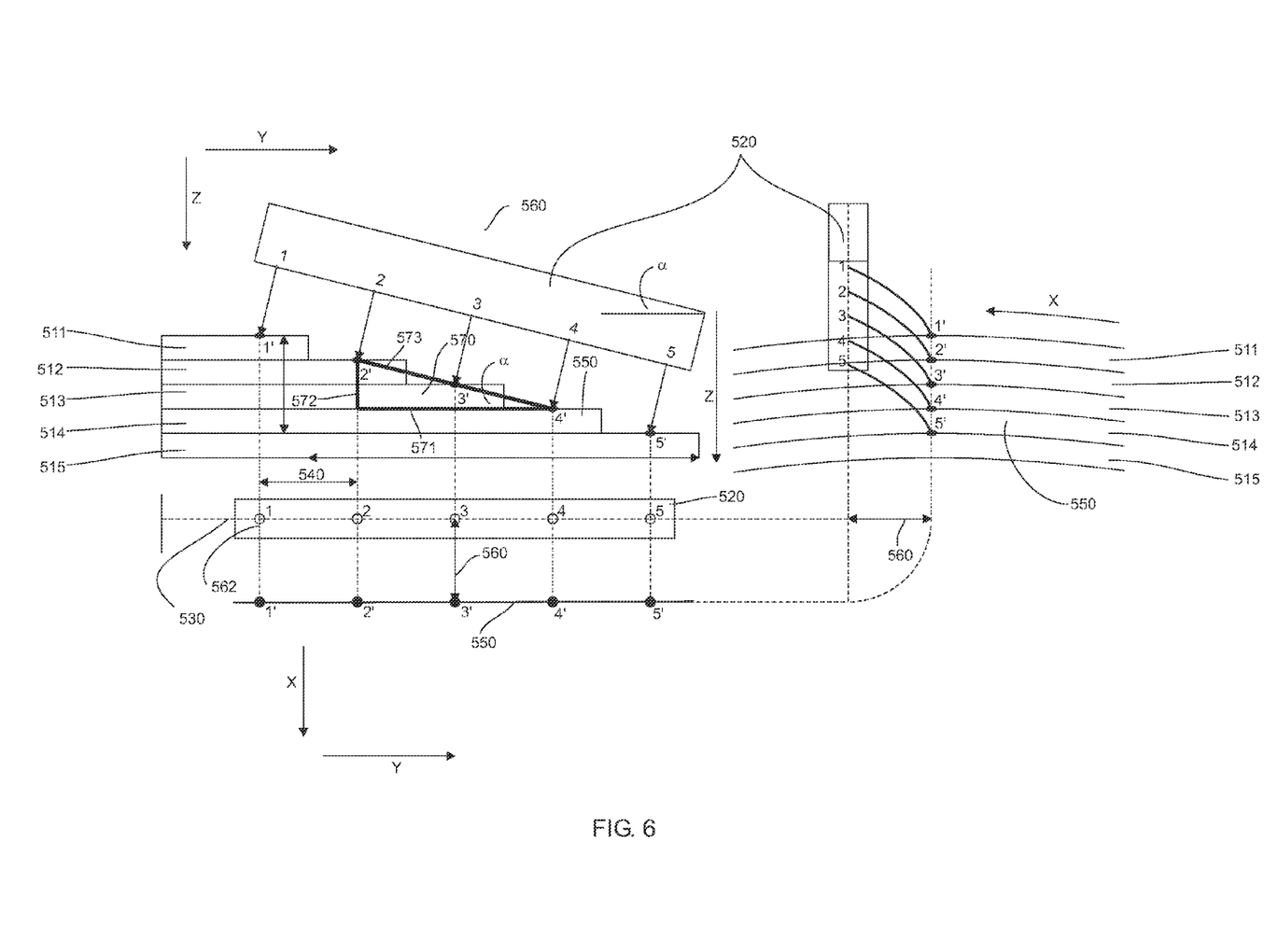
FIG. 6 shows projections in the Y-Z, X-Y and X-Z planes that demonstrate how the effect of the landing position lag is reduced by rotating the printhead in a Y-Z plane.

In FIG. 6 a right triangle 570 has a first cathetus 571 parallel with the Y-dimension, and a second cathetus 572 parallel with the Z-dimension.

$\alpha$ refers to the angle between the first cathetus 571 and the hypotenuse 573 of the right triangle 570.

The value of $\alpha$ in FIG. 5 is determined as follows:

In FIG. 5 a nozzle[4] belongs to a leading edge portion of the printhead 510. It ejects fluid droplets on layer[4] having a diameter value equal to Diameter[4], whereas nozzle[2]

belongs to a trailing edge portion of the same head 510 and ejects fluid on layer[2], having a diameter value equal to Diameter[2].

y[2] is a coordinate along the Y dimension that is determined by the cross section between a plane that is orthogonal to the Y axis and that passes through nozzle[2].

y[4] is a coordinate along the Y dimension that is determined by the cross section between a plane that is orthogonal to the Y axis and that passes through nozzle[4].

The difference Δy[2][4] between y[2] and y[4] corresponds with the length of a first cathetus 571 of the right triangle 570 in FIG. 5 and is equal to:

$$\Delta y[2][4] = y[4] - y[2]$$

The Z-coordinate z[2] in FIG. 5 has a value equal to Diameter[2]/2 in which Diameter[2] is equal to the diameter of layer[2].

The Z-coordinate z[4] in FIG. 5 has a value equal to Diameter[4]/2 in which Diameter[4] is equal to the diameter of layer[4].

The second cathetus 572 of the right angled triangle 570 has a value that is equal to:

$$\Delta z[2][4] = z[4] - z[2] = \text{Diameter}[4]/2 - \text{Diameter}[2]/2$$

The angle α in the right angle triangle 570 is expressed as a function of Δy[2][4] and Δz[2][4] as:

$$\alpha = \arctan(\Delta z[2][4]/\Delta y[2][4])$$

FIG. 6 shows that by rotating the printhead 520 in the Y-Z plane under the angle α, the nozzle row in the printhead becomes parallel with the hypotenuse of the triangle 570.

The effect of this is that the distances that the droplets have to travel from the orifices of the nozzles to the layers become substantially equal.

The landing position lag of the droplets that are ejected by different nozzles becomes substantially equal as a result of this. In effect, all the droplets undergo a substantially identical landing position lag, as is also shown in the X-Z cross section in FIG. 6.

In FIG. 6 nozzle[4] was selected as a member of the leading edge portion of the printhead and nozzle[2] was selected as a member of the trailing edge portion of the printhead.

In a more general case a nozzle[j2] is a member of the leading edge portion of the printhead and jets on a layer[i2] having a diameter[i2].

nozzle[j1] is a member of the trailing edge portion of the printhead and jets on a layer[i1] having a diameter[i1].

y[j2] is a coordinate along the Y dimension that is determined by the cross section between a plane that is orthogonal to the Y axis and that passes through nozzle[j2].

y[j1] is a coordinate along the Y dimension that is determined by the cross section between a plane that is orthogonal to the Y axis and that passes through nozzle[j1].

The difference Δy[j1][j2] between y[j2] and y[j1] corresponds with a first cathetus 571 of the right angle triangle 570 and is expressed by:

In that case the length of first cathetus of right triangle is defined as:

$$\Delta y[j1][j2] = y[j2] - y[j1]$$

The value Δy[p][j2] corresponds with the distance between the nozzle[j1] being a member of the trailing edge portion of the printhead and nozzle[j2] being a member of the leading edge portion of the printhead.

The Z-coordinate z[i2] in FIG. 5, in which nozzle row of the printhead 520 is parallel with the central axis of the drum, has a value equal to Diameter[i2]/2.

The Z-coordinate z[i1] in FIG. 5 has a value equal to Diameter[i1]/2.

The difference between z[i2] and z[i1] is expressed by:

$$\Delta z[i1][i2] = z[i2] - z[i1] = \text{Diameter}[i2]/2 - \text{Diameter}[i1]/2$$

This provides a preferred value for the angle α:

$$\alpha = \arctan(\Delta z[i1][i2]/\Delta y[p][j2])$$

There may be instances that it is not necessary or even desirable to rotate the printhead exactly by the amount α in the above expression. In that case the following expression may be used for the angle α

$$\alpha = r \cdot \arctan(\Delta z[i1][i2]/\Delta y[p][j2])$$

in which:

$$0.1 \leq r \leq 2.0$$

In yet another preferred embodiment the rotation by the angle α meets the following constraint:

$$\alpha = r \cdot \arctan(\Delta z[i1][i2]/\Delta y[p][j2])$$

in which:

$$0.5 \leq r \leq 1.5$$

In yet another preferred embodiment the rotation by the angle α meets the following constraint:

$$\alpha = r \cdot \arctan(\Delta z[i1][i2]/\Delta y[j1][j2])$$

in which:

$$0.9 \leq r \leq 1.1$$

In yet another preferred embodiment the rotation by the angle α meets the following constraint:

$$\alpha = r \cdot \arctan(\Delta z[i1][i2]/\Delta y[j1][j2])$$

in which:

$$0.99 \leq r \leq 1.01$$

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A method for preparing a cylindrical relief object, the method comprising the steps of:
   rotating a cylindrical support around a central axis, the central axis being parallel or substantially parallel with a Y-dimension;
   ejecting curable fluid droplets towards a surface of the cylindrical support from a printhead including a row of nozzles while the printhead moves in the Y-dimension at a speed that is locked to a rotating frequency of the cylindrical support; wherein
      the printhead includes a trailing edge portion including a first nozzle of the row of nozzles arranged to eject fluid droplets on a first layer having a first diameter;
      the printhead includes a leading edge portion including a second nozzle of the row of nozzles arranged to eject fluid droplets on a second layer having a second diameter that is larger than the first diameter;
   curing the ejected droplets by a curing source;
   defining a first variable dY that defines a distance between the first nozzle and the second nozzle; and
   defining a second variable dZ that defines half of a distance between the first diameter and the second diameter; wherein the row of nozzles has been rotated in a plane that includes the central axis by a fixed amount equal to r*{artan (dZ/dY)} so that the row of nozzles is not parallel to the central axis; and 0.1<r<2.0.

2. The method according to claim 1, wherein 0.5<r<1.5.
3. The method according to claim 1, wherein 0.9<r<1.1.
4. The method according to claim 1, wherein 0.99<r<1.01.
5. The method according to claim 1, wherein the cylindrical relief object is a flexographic printmaster.
6. The method according to claim 1, wherein the curable fluid droplets are UV curable and the curing source is a UV light source.

\* \* \* \* \*